United States Patent [19]
Schneider

[11] 3,864,601
[45] Feb. 4, 1975

[54] ELECTRONIC FLASH DEVICE
[75] Inventor: Arthur Schneider, Volkenrode, Germany
[73] Assignee: Rollei-Werke Franke & Heidecke, Braunschweig, Germany
[22] Filed: May 14, 1973
[21] Appl. No.: 360,197

[30] Foreign Application Priority Data
    May 19, 1972  Germany............................ 2224443

[52] U.S. Cl.............. 315/241 P, 315/151, 315/159
[51] Int. Cl.......................... G01j 1/16, H05b 41/32
[58] Field of Search.... 315/151, 159, 241 R, 241 P, 315/173

[56]         References Cited
          UNITED STATES PATENTS
3,590,314   6/1971   Krusche........................... 315/151
3,725,734   4/1973   Schneider...................... 315/241 P
3,758,817   9/1973   Elliott........................ 315/241 P X Primary Examiner—John Kominski
Assistant Examiner—E. R. LaRoche
Attorney, Agent, or Firm—Stonebraker & Shepard

[57]  ABSTRACT

Electronic flash apparatus for photographic purposes, having a main storage capacitor for initially powering a flash tube, and at least one additional storage capacitor providing additional power for the flash tube if more light is needed than can be produced from the main or first storage capacitor. A quench tube or short circuiting tube is provided for terminating the flash when sufficient light for the desired photographic purpose has been produced. A phototransistor responsive to the amount of light reflected from the subject being photographed, serves to control both the operation of the quench tube and the operation of an actuating tube when serves to connect the second storage capacitor operatively to the flash tube. Safeguard circuits or interlocking circuits are provided to insure against faulty operation.

6 Claims, 1 Drawing Figure

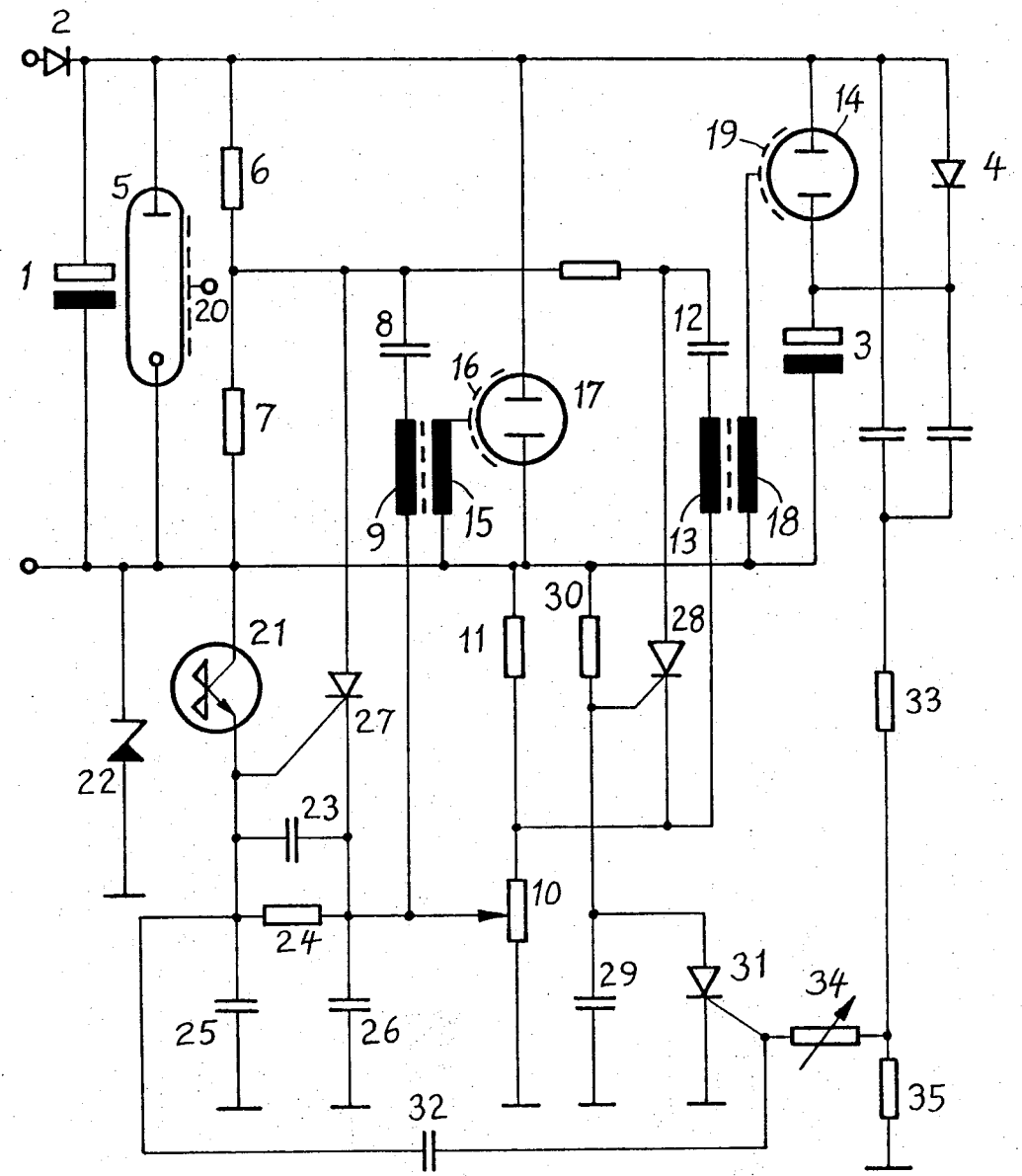

ELECTRONIC FLASH DEVICE

BACKGROUND OF THE INVENTION

This application relates to an improvement on the invention disclosed in my application Ser. No. 122,411, filed Mar. 9, 1971, which has now become U.S. Pat. No. 3,725,734, granted Apr. 3, 1973.

The prior application discloses electronic flash apparatus for photographic purposes, having a series of capacitors providing power for flashing the flash tube. Only a single capacitor is initially connected to the flash tube, and as the flash progresses, additional capacitors are successively connected to the flash tube to provide additional power for the flash and therefore more light, if more light is needed, but no further capacitors are connected to the flash tube when sufficient light (as measured by reflection from the subject being photographed) has been produced.

The present invention relates to apparatus of the same general type, but with improved circuits. The object of the invention is to simplify the circuit system, insofar as one single phototransistor serves both to control the quenching device for the termination of the flash discharge and to interrupt the actuation of the respective additional capacitors. According to the invention, the control of the blocking of the actuation device for the additional capacitors is derived from the integration circuit of the phototransistor for the control of the quenching tube which serves to terminate the flash discharge.

BRIEF DESCRIPTION OF THE DRAWING

The single view of the drawing is a circuit diagram illustrating a preferred embodiment of the invention.

DESCRIPTION OF THE PREFERRED EMBODIMENT

The apparatus comprises a storage capacitor 1 which is charged from a source of current through the rectifier 2, shown connected to one side of the supply mains and one side of the capacitor 1. The other side of the capacitor 1 is connected to the other side of the supply mains. A second capacitor 3 is charged through the decoupling diode 4. The flash tube 5, of conventional construction, is connected in parallel with the storage capacitor 1. A voltage divider having resistors 6 and 7 is also connected in parallel with the flash tube 5 and the storage capacitor 1.

The voltage divider is connected, as shown, to the primary quenching ignition circuit which includes the capacitor 8, the primary transformer winding 9, the potentiometer 10, and the resistor 11. The voltage divider is also connected, as shown, to the capacitor 12 and primary transformer winding 13 of a control circuit or flash ignition circuit for the actuating or control tube 14 of the second storage capacitor 3.

The secondary winding 15 of the transformer 9, 15 is connected as illustrated to the firing electrode 16 of the conventional quench tube or short circuiting tube 17. The secondary winding 18 of the second transformer 13, 18 is connected as shown to the firing electrode 19 of the actuating tube or control tube 14.

The flash tube 5 is provided with the conventional firing electrode 20, which is activated in the usual conventional way, in synchronism with the operation of the shutter of the camera with which this flash apparatus is used, so that the flash of light is produced while the camera shutter is open. Activation of the firing electrode 20 causes the flash tube 5 to fire, producing light to illuminate the subject being photographed. When the flash tube is ignited, the photo diode 21 receives a voltage which is maintained at 10 volts by the Zener diode 22. The current emitted by the phototransistor 21 is stored up by the integration circuit comprising the capacitor 23, resistor 24, capacitor 25, and capacitor 26. When the bias voltage, selectable by adjustment of the potentiometer 10, is reached, the ignition thyristor 27 of the ignition circuit 8, 9 is triggered. In other words, the thyristor 27 now becomes conductive, so that the charge on the capacitor 8 can discharge through the primary winding 9, creating a high voltage in the secondary winding 15, to activate the firing electrode 16 of the quench tube 17, so that the quench tube is ignited. Any charge then remaining on the storage capacitor 1 is thus discharged by short circuiting through the quench tube 17, to stop the flash then in progress, in known manner. Except for the use of the phototransistor 21, this quenching circuit or flash terminating circuit corresponds to the customary structure well understood in the art.

In the primary circuit 12, 13 of the actuating tube or control tube 14 there is a further thyristor 28 which can be triggered by a slow voltage increase in the capacitor 29 or resistor 30, connected in the circuitry as illustrated. When the thyristor 28 is driven hard, causing it to become conductive, the charge on the capacitor 12 discharges across the primary winding 13, thus producing sufficient voltage in the secondary winding 18 of this ignition transformer, to activate the ignition electrode 19 of the actuating or control element 14, as a result of which the tube 14 becomes conductive and operatively connects the second storage capacitor 3 in parallel with the flash tube 5. The units are so dimensioned that with a slow voltage increase, as a result of comparatively weak illumination falling on the phototransistor 21, this triggering operation (rendering the tube 14 conductive) takes place prior to the ignition of the quenching tube or short circuiting tube 17.

A third thyristor 31 is connected as illustrated, in parallel with the capacitor 29. When the phototransistor 21, under conditions of bright illumination, charges up the integration capacitor 23 with a very high current, the voltage change through the integration capacitor 23 becomes so great that it is transmitted through the coupling capacitor 32 to the trigger connection of the thyristor 31. The more rapidly this voltage change via the integration capacitor takes place, the greater will be the voltage impulse in the trigger connection of the thyristor 31, so that the thyristor 31 is triggered to become conductive, thus discharging the capacitor 29, as a result of which the thyristor 28 can no longer be triggered by the capacitor 29. In this case, therefore, the capacitor 3 remains inoperative, because the tube 14 is not fired and does not become conductive. Therefore, if a great deal of light reaches the phototransistor 21, so that the flash produced by the power in the first storage capacitor 1 will certainly be sufficient to produce the necessary quantity of light for purposes of the photograph, and so that it will not be necessary to use additional power from the second storage capacitor 3, the actuation of the second storage capacitor 3 is thus prevented and the charge on it is conserved for future use.

An additional interlocking system is also provided, in that the gate of the thyristor 31 is connected to the anode voltage of the apparatus via a protective resistor 33 and a variable resistor 34 as well as a small ohmic resistor 35. The resistor 35 is so small that when the flash apparatus is actuated in the normal manner, no appreciable voltage occurs. Not until the quenching operation takes place, when a multiple of the flash current flows through the quenching or short circuiting tube 17, will the voltage in the resistor 35 become so great that the thyristor 31 is triggered. This insures that the storage capacitor 3 will not be rendered operative during or immediately after the quenching process, and this provides an additional safety measure against undesired operative connection of the second storage capacitor 3 to the flash tube.

To those skilled in the circuitry of electronic flash apparatus, it will be readily apparent from the drawing how the various components or elements are connected to each other. Therefore the various circuit connections have not been described in words, the drawing or wiring diagram being relied upon to indicate to those skilled in the art how the connections should be made.

Only one additional storage capacitor 3, in addition to the main storage capacitor 1, has been illustrated. However, in view of the foregoing teaching, it will be readily apparent to those skilled in the art that any desired number of additional storage capacitors can be provided, each successively connectable to the flash tube by the same kind of connecting, controlling, and protecting circuits here illustrated with respect to the capacitor 3. The above mentioned main U.S. Pat. No. 3,725,734 discloses the use of three or more storage capacitors successively brought into play, and the same principle of using any desired number of additional storage capacitors applies to the improved circuitry disclosed in the present application as well as to the earlier form of circuitry disclosed in the above mentioned patent.

What is claimed is:

1. Electronic flash apparatus for photographic purposes comprising flash tube means for generating a light flash, a first storage capacitor for initially powering said flash tube means, a second storage capacitor for supplying additional power when needed to said flash tube means, light sensitive means for deriving a changing voltage the rate of which is a function of the light flash reflected from a subject being photographed, quench means shiftable from an inoperative state to an operative state and effective, when shifted to its operative state, to terminate a flash then in progress, first circuit means for operatively connecting said second storage capacitor to said flash tube means when the rate of said changing voltage is below a given rate and operatively disconnecting it from said flash tube means when the rate of said changing voltage is above said given rate, said first circuit means including an ignition thyristor, an integration capacitor for triggering said ignition thyristor when said rate of changing voltage is below said given rate, integration circuit means for controlling operation of said quench means, said integration circuit means being responsive to light reflected from a subject being photographed and a control thyristor bridging said integration capacitor, said control thyristor having a gate coupled to said means for deriving a changing voltage through a differentiation capacitor, said control thyristor serving to short circuit said integration capacitor when the rate of said changing voltage exceeds a predetermined rate.

2. The invention defined in claim 1, wherein said control circuit means comprises a phototransistor responsive to said reflected light, a thyristor (28) effective, when triggered, to shift said switch means to a conductive state, and means connected to said phototransistor to block said thyristor (28) from being triggered when said initial brilliance of said reflected light at the beginning of a flash exceeds said predetermined value.

3. Electronic flash apparatus for photographic purposes comprising flash tube means for generating a light flash, a first storage capacitor for initially powering said flash tube means, a second storage capacitor for supplying additional power when needed to said flash tube means, light sensitive means for deriving a changing voltage the rate of which is a function of the light flash reflected from a subject being photographed, quench means shiftable from an inoperative state to an operative state and effective, when shifted to its operative state, to terminate a flash then in progress, first circuit means for operatively connecting said second storage capacitor to said flash tube means when the rate of said changing voltage is below a given rate and operatively disconnecting it from said flash tube means when the rate of said changing voltage is above said given rate, said first circuit means including an ignition thyristor, an integration capacitor for triggering said ignition thyristor when said rate of changing voltage is below said given rate, integration circuit means for controlling operation of said quench means, said integration circuit means being responsive to said rate of changing voltage, and a control thyristor bridging said integration capacitor, said control thyristor having a gate coupled to said integration circuit means through a differentiation capacitor, said control thyristor serving to short circuit said integration capacitor when the rate of said changing voltage exceeds a predetermined rate.

4. Electronic flash apparatus for photographic purposes, comprising flash tube means for generating a light flash, a first storage capacitor for initially powering said flash tube means, a second storage capacitor for supplying additional power when needed to said flash tube means, quench means shiftable from an inoperative state to an operative state and effective when shifted to its operative state, to terminate a flash then in progress, light sensitive means for deriving a changing voltage the rate of which is a function of the light flash reflected from a subject being photographed, actuating means connected to said light sensitive means for supplying power from said second storage capacitor to said flash tube means only when said rate of changing voltage is below a given rate, said actuating means including an integration capacitor for operating said actuating means and means responsive to said rate of changing voltage for short circuiting said integration capacitor to prevent operation of said actuating means only when said rate of said changing voltage is above a given rate.

5. Apparatus as defined in claim 4, further including safety means operating said short circuiting means when said quench means has been operated.

6. Electronic flash apparatus comprising:
 a. a main storage capacitor;
 b. a second storage capacitor;
 c. electrical supply means for electrically charging said capacitors;

d. flash tube means connected to said storage capacitors for generating a light flash upon discharge of one or both of said capacitors through said flash tube means;
e. quench means shiftable from an inoperative state to an operative state and effective when in an operative state to short circuit whatever capacitor is then discharging through said flash tube means, thereby to terminate a flash which is then in progress;
f. light sensitive means responsive to the intensity of light reflected from a subject being photographed to generate a changing voltage the rate of change of which is a function of the intensity of said reflected light; and
g. circuit means responsive to the rate of change of said changing voltage for operatively connecting said second capacitor to said flash tube means to discharge therethrough only when the rate of change of said changing voltage is less than a predetermined value and for operatively disconnecting said second capacitor from said flash tube means when the rate of change of said changing voltage is greater than a predetermined value.

7. The invention as defined in claim 1, further comprising safety means 33, 34, 35 additionally coupling said gate of said control thyristor 31 to said quench means 17, said safety means causing said control thyristor to become conductive upon shifting said quench means from its inoperative state to its operative state, thereby causing said control thyristor 31 to short circuit said integration capacitor 29 when said quench means becomes operative.

* * * * *